United States Patent [19]

Ishikawa et al.

[11] 4,117,051
[45] Sep. 26, 1978

[54] CARBON ARTICLE MANUFACTURING METHOD

[75] Inventors: Toshikatsu Ishikawa, Tokyo; Junichi Tanaka, Yokohama; Yoichiro Tominaga, Sagamihara; Kunio Matsubara, Yokohawa; Yoshihiko Kitazume, Yamanashi; Tokuji Hayase, Fujisawa, all of Japan

[73] Assignee: Nippon Carbon Co., Ltd., Tokyo, Japan

[21] Appl. No.: 690,302

[22] Filed: May 26, 1976

[30] Foreign Application Priority Data

May 30, 1975 [JP] Japan .................. 50-64950

[51] Int. Cl.$^2$ .................. C01B 31/02; C01B 31/04
[52] U.S. Cl. .................. 264/29.1; 264/114; 264/311; 423/445; 423/448; 423/449
[58] Field of Search .................. 423/448, 449, 445; 264/29.1, 29.3, 114, 311

[56] References Cited

U.S. PATENT DOCUMENTS

| 2,892,218 | 6/1959 | McGhee et al. .................. 264/29.1 |
| 2,965,931 | 12/1960 | Alden et al. .................. 264/29.1 X |
| 3,104,159 | 9/1973 | Davidson .................. 423/448 |
| 3,329,751 | 7/1967 | Slicker et al. .................. 264/114 X |
| 3,991,170 | 11/1976 | Singer .................. 423/449 |

OTHER PUBLICATIONS

Spencer, SPE Journal, Jul. 1962, pp. 774–779.

*Primary Examiner*—Edward J. Meros
*Attorney, Agent, or Firm*—McNenny, Pearne, Gordon, Gail, Dickinson & Schiller

[57] ABSTRACT

A carbon article manufacturing method is disclosed in which a raw material for a carbon article is revolved and heated at the same time, whereby the raw material is pressurized by centrifugal force and baked simultaneously. Further, carbon article manufacturing apparatus is disclosed which is provided with means for housing a raw material and pressurizing it by centrifugal force, means for revolving the housing and pressurizing means, and means for heating the housing and pressurizing means.

9 Claims, 5 Drawing Figures

FIG. I

CARBON ARTICLE MANUFACTURING METHOD

BACKGROUND OF THE INVENTION

This invention relates to a carbon article manufacturing method and apparatus therefor. More particularly, the invention is directed to a carbon article manufacturing method and apparatus which achieve simultaneous baking and molding of a coking material, which is fluidized when heated, such, for example, as a pitch or a raw material containing it, by pressurization with centrifugal force during heating and, in addition, perform the baking rapidly.

DESCRIPTION OF THE PRIOR ART

Heretofore, carbon articles have been employed, for example, as seals, bearings, packings and friction members for mechanical use; molds, furnace parts and rocket nozzles for heat-resisting use; anodes for chlorine cells, acid-resistant plumbing and hardware for chemical use and parts for nuclear reactors, etc. Generally, in the case of making such carbon articles, an aggregate such, for example, as petroleum cokes or coal cokes, is ground and then screened to obtain particles of appropriate grain sizes. The particles thus obtained, are mixed with a binder such as a pitch material to obtain a raw material. The raw material is heated and kneaded at a temperature ranging from 120° to 180° C and then molded by extrusion or press-molding into moldings of desired shapes and sizes such, for example, as rods, cylinders, plates and bricks. Then, the moldings are baked, for example, in a baking furnace at about 700° to 1200° C for as long a period of time as several days to 1 month and, if necessary, the moldings are graphitized by heating, for example, in a batch-type (Acheson) or continuous-type (Sanders) electric furnace at about 2400° to 3000° C.

With such a method, however, the molding and baking processes are carried out individually and independently of each other. This requires a great deal of labor and, in addition, the baking process extends over a long period of time and such a time-consuming baking process is seriously disadvantageous from the viewpoint of productivity. In the case of press-molding, the moldings are sometimes graphitized by simultaneous pressurization and heating. With this method, pressurization prevents evaporation of volatile matters to provide for enhanced carbonization ratio of the binder, by which compact carbon articles can be obtained. In this case, however, since the moldings are pressurized and baked in closed molds gaseous components of volatile matters which do not contribute to carbonization are not well removed from the molds and hence are likely to be contained in the moldings. This introduces the possibilities of fine cracks or cavities being formed in the moldings. Particularly, large-sized moldings are liable to be rejected on account of cracks and the yield rate is low. Further, during baking, one part of the binder, especially a volatile matter, has escaped in the form of gas to separate the aggregate and the binder from each other and the parts from which the volatile matter escaped form a pore, which is undesirable. In order to alleviate the defect resulting from escape of the volatile matter during baking, it is customary in the prior art to gradually raise the baking temperature for a long period of time to thereby gradually volatilize the volatile matter. (For example, in the case of baking ordinary carbon materials, the baking temperature is raised at the rate of about 4° C/hr to 600° C.) Even with such baking, however, it is difficult to completely volatilize the volatile matter and a carbon of compact structure cannot be obtained. Therefor, it is a matter of common knowledge in the art that an ordinary carbonaceous or artificial graphitic carbon article has permeability of about 20 %.

SUMMARY OF THE INVENTION

This invention provides a carbon article manufacturing method and apparatus which are free from the abovesaid defects of the prior art and with which it is possible to simultaneously mold and bake a raw material for the manufacture of a carbon article and, further, to rapidly achieve the baking.

The primary object of this invention is to provide a carbon article manufacturing method which simultaneously bakes and molds a raw material for the manufacture of a carbon article by revolving the raw material while heating to apply thereto pressure by centrifugal force.

Another object of this invention is to provide a method for making a hollow, cylindrical member from the abovesaid raw material.

Still another object of this invention is to provide a carbon article manufacturing apparatus which is provided with means for housing the raw material and applying pressure thereto by centrifugal force, means for revolving the housing means and means for heating the housing means.

Other objects, features and advantages of this invention will become more apparent from the following description taken in conjunction with the accompanying drawings.

DESCRIPTION OF THE PREFERRED EMBODIMENTS

Figure 1:
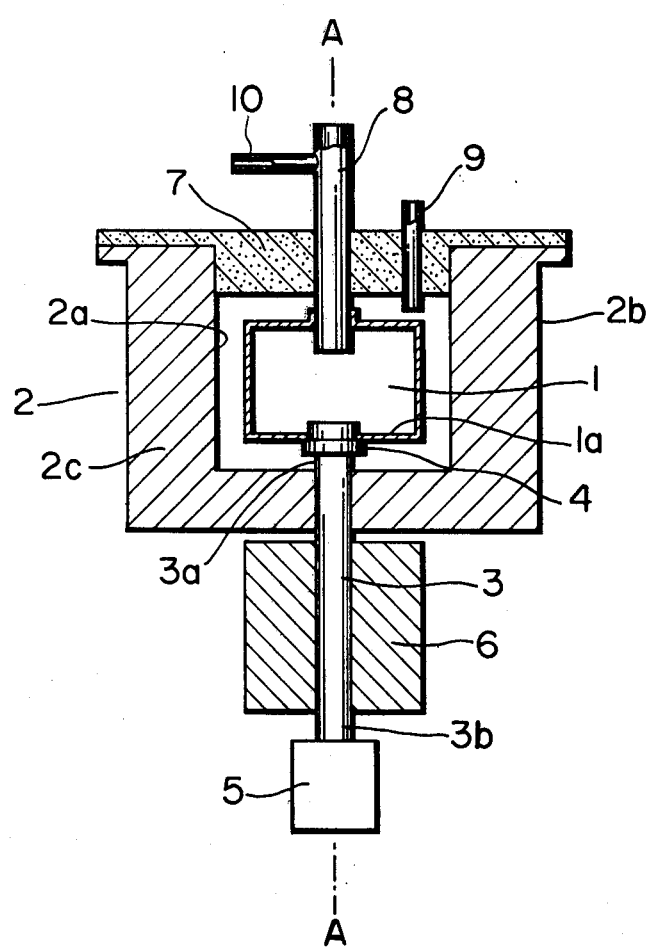
FIG. 1 is a longitudinal-sectional view showing one example of carbon article manufacturing apparatus of this invention.

In FIG. 1, reference numeral 1 indicates, for example, a rotary drum for housing a raw material and a carbon article obtained therefrom. The rotary drum 1 is usually made of heat resisting steel or the like and shaped to conform to a carbon article desired to be produced. For example, in the case of producing a hollow carbon article, the rotary drum 1 is constructed in a cylindrical form.

The cylindrical drum 1 is surrounded by heating means such, for example, as a heating furnace 2, by which the cylindrical drum 1 is heated from the outside thereof. In this case, the heating means can be constructed in any desired configuration so long as it can heat the housing means from the outside thereof. However, as illustrated in FIG. 1, the heating furnace 2 is usually composed, for example, of inner and outer cases 2a and 2b, an adiabatic material 2c interposed between the inner and outer cases 2a and 2b and a heater (not shown) provided in the adiabatic material 2c in adjacent relation to the inner case 2a. The rotary drum 1 is disposed in the inner case 2a of the heating furnace 2 of the above construction and, in such a case, the rotary drum can be easily heated from the outside thereof by an electric heater or the like. It is also possible to employ, in place of such an electric heater, a high-frequency heating or like electric heater or heating means using fuel such as gas, liquid or the like. In the heating furnace 2 constructed as described above, the rotary drum 1 is rotatably supported at its center axis (the line A—A in FIG. 1). For example, a rotary shaft 3 is passed through the heating furnace 2 along the center line A—A thereof and, for example, a metal fitting 4 is attached to one end 3a of the rotary shaft 3 and is fixed to a bottom plate 1a of the rotary drum 1. On the other hand, the other end 3b of the rotary shaft 3 is exposed to the outside of the heating furnace 2 and drive means such as, for example, an electric motor 5, is coupled with the end 3a of the rotary shaft 3. Thus, the rotary shaft 3 and the rotary drum 1 coupled therewith are driven by the electric motor 5. Further, since the end 3a of the rotary shaft 3 is exposed in the inner case 2a which is heated to high temperature, there is the possibility that the electric motor 5 may be damaged by heat transmitted thereto through the rotary shaft 3. To avoid this, cooling means such, for example, as a cooling oil seal 6 or the like is provided between the outer case 2b and the motor 5 in a manner to surround the rotary shaft 3 as illustrated.

The upper open end portion of the heating furnace 2 constructed as described above is sealed hermetically with cover means 7 which is lined with an adiabatic material or the like. In order to supply a raw material into the rotary drum 1 from the outside of the cover means 7, there is provided in the cover means 7 raw material supply means such, for example, as an inlet pipe 8. With such an arrangement, a raw material can be continuously supplied little by little to the rotary drum 1 from the outside of the heating furnace 2.

It is also possible to construct the abovesaid inlet pipe 8 to reciprocate along the center axis (the line A—A in FIG. 1) of the rotary drum 1 and to form at the lower end portion of the pipe 8 a nozzle comprising a relatively large number of small holes. With such arrangements, a coking material fused by heating at high temperature can be jetted in the form of droplets or fibers into the rotary drum 1 from the nozzle of the inlet pipe 8 at high speed, by which a hollow carbon article can be readily produced.

Further, in order to maintain a non-oxidizing atmosphere in the heating furnace 2, there is formed in the cover means 7 an atmosphere gas inlet port 9 for an inert gas such, for example, as nitrogen, argon or helium gas, or a reducing gas such, for example, as hydrogen or the like. In this case, it is preferred to branch a gas exhaust pipe 10 from the inlet pipe 8 at its upper end portion. With the cover means of such a construction as described above, a non-oxidizing gas such as nitrogen gas or the like can be introduced from the inlet port 9 to establish a non-oxidizing atmosphere in the heating furnace 2. Moreover, exhausted gas during baking is drained out through the inlet pipe 8 and the exhaust pipe 10. The volatile matter of the pitch contained in the exhausted gas drained out from the exhaust pipe 10 can be used again as a fuel for the heating furnace 2. The pressure in the rotary drum can be raised or lowered as required. The inside of the heating furnace 2 is usually maintained under the non-oxidizing atmosphere but, in order to prevent an abnormal temperature rise due to condensation or polymerization of the coking material at the initial to middle stage of heating (about 300° to 500° C), it is also possible to introduce water or steam from the inlet port 9 into the heating furnace 2 to adjust the temperature therein.

In the case of making a hollow carbon article from coking material by the employment of such a carbon material manufacturing apparatus as described above in connection with FIG. 1, strips of, for example, carbon fiber or carbon cloth, are arranged on the inner wall of the cylindrical rotary drum 1 as of heat resisting steel in its axial direction. The rotary drum 1 is driven by the electric motor 5 at high speed and a non-oxidizing gas such, as for example, nitrogen gas is introduced from the inlet pipe 9 into the heating furnace 2 to provide therein a non-oxidizing atmosphere and, further, the heating furnace 2 is energized to heat the revolving rotary drum 1 from the outside thereof.

Under such a condition, a raw material such, for example, as the coking material is fused by heating, for example, up to 300° C or higher and the fused coking material is jetted out from the nozzle of the inlet pipe 8 into the rotary drum 1 at high speed. In such a case, the fused coking material dashes against the inner wall of the cylindrical drum 1 due to centrifugal force and adheres thereto to be gradually piled up. In this case, by heating the outer periphery of the rotary drum 1, for example, at 300° to 500° C, a volatile matter in the piled coking material gradually volatilizes and, at the same time, the coking material itself is gradually condensed, pressurized and baked.

The coking material herein mentioned may be any material so long as the abovesaid object can be attained. In an ordinary case, it is sufficient to use a pitch or a resin or a material composed principally of such pitch. The pitch herein mentioned includes a petroleum pitch, a coal tar pitch, natural asphalt and a pitch-like material obtained as a by-product in industrial production. Further, the resin includes natural resins or resins of furan, phenol, vinyl chloride systems which can be carbonized by heat treatment.

In the case of manufacturing a carbon article by the use of the pitch as a coking material, pitch now on the market generates a large amount of gas, so that it is preferred to dry-distil the pitch at 300° to 450° C previously. Of course, coal can also be used instead of the pitch.

Moreover, by pretreating pitch or resin with an acidic or oxidizing compound such as air, hydrogen peroxide, oxygen, nitric oxide, sulfur dioxide or the like at 150° to 350° C, the rate of carbonization during baking can be enhanced but, in this case, the resulting carbon article is likely to become a hard carbon.

In the above, the carbon article manufacturing apparatus is a vertical type but, of course, a horizontal type can also be employed.

Further, by baking the raw material while pressurizing it by centrifugal force, a carbon article can be produced without the necessity of such complicated steps as grinding, screening, mixing and kneading of raw material, supplying of the material into the baking furnace, removing therefrom the baked article, placing the baked article into a graphitizing furnace and removing therefrom the graphitized article. That is, the manufacturing process can be simplified and a hollow carbon article of compact structure, which is free from cracks and cavities and large in size, can be readily obtained in a short period of time.

Namely, in the case of heating a coking material, for example, pitch, compounds of low boiling point start to volatilize at about 200° C and as temperature rises, condensation or polymerization reaction of the pitch, proceeds and when the temperature reaches 450° to 500° C, the pitch is completely solidified to be what is called a "baked" article. In this case, if the baking is achieved without pressurization, the volatile matters in the compound of low melting point leave pores, with the result that the baked article is porous. With this invention, however, the rotary drum 1 is revolved and the pitch is pressurized by centrifugal force, so that the resulting baked article is not porous but compact. The pressure applied by centrifugal force is given by the following formula:

$$P = \frac{\rho\omega^2}{2gc}(r_2^2 - r_1^2), \omega = \frac{2\pi}{60} \times rpm$$

where $P$ is the bulk density of the pitch during baking; $\omega$ is an angular velocity; $gc$ is the acceleration of gravity; $r_1$ is the inner diameter of the article; $r_2$ is the outer diameter of the article.

The number of revolutions of the rotary drum per unit time is preferably such that a pressure of at least 10 kg/cm² is applied to the surface of the accumulated pitch. The higher the pressure is, the more compact the article becomes. However, in view of the mechanical strength of the apparatus used, it is preferred that the upper limit of the pressure is 500 kg/cm².

For example, in the case of making an electrode having an outer diameter of 610 mm (24 inches), a pressure of 10 to 100 kg/cm² can be applied to the surface of the pitch by revolving the rotary drum 1 at 1200 to 3700 rpm. and the surface portion becomes a compact structure having a bulk density of 1.5 to 1.8. As the center of the baked article is approached, the pressure applied to the baked article decreases and its bulk density also decreases. Thus, the quality of an electrode or the like graphitized thereafter is high. For example, in the electrode obtained by graphitizing the baked article, its surface layer portion is low in electric resistance and is a good conductor, but its central part is not so compact and is high in electric resistance, and hence is a poor conductor. Accordingly, there is no possibility of spalling. Further, in the case of making the hollow carbon article as described above, it is also possible to employ a preimpregnated sheet of arranged carbon fibers, a knitted bag-like net, strips of knitted cloth, cords, mats, cotton-like members, chopped or long fibers. In such a case, by directly applying a current to them to generate heat by resistance, graphitization can be achieved. The surface portion of the electrode thus obtained is mechanically strong and low in electric resistance, so that it is suitable for use as an electrode for UHP (an ultra-high load) which is more than 20 inches thick, coupled with the skin effect during conduction of a thick electrode. It is a matter of course that the abovesaid baked article can be graphitized by a known method. It is also preferred that the nipple for the hollow electrode is one produced by molding a mixture of chips of carbon fiber.

Further, by forming the carbon fiber layer with a sufficient thickness by lamination, winding, arranging or the like, by heating the layer and by jetting pitch or the like to the layer to be accumulated thereon while, pressurizing by centrifugal force, the pitch or the like well penetrates into the carbon fiber layer and is carbonized while being pressurized. As a result of this, a hollow carbon article completely reinforced with the carbon fiber can be obtained.

The foregoing has been described in connection with the case where a hollow carbon article is formed of only a coking material such as pitch. However, it is also possible to make a carbon article from a mixture of the coking material such as pitch and a carbon material such as cokes.

Namely, the rotary drum 1 is driven by the motor 5 through the rotary shaft 3. Then, for example, pitch and cokes are supplied through the inlet pipe 8 of the revolving rotary drum 1. Further, as is the case with the foregoing, nitrogen gas or like non-oxidizing gas is introduced from the inlet port 9 into the heating furnace 2 to maintain therein a non-oxidizing atmosphere and the rotary drum 1 is heated by the heater of the heating furnace 2 up to, for example, about 450° to 700° C.

In such a case, the raw material, even if composed of the pitch and cokes, is compressed by centrifugal force and, at the same time, baked by heating, thus providing a carbon article of compact structure as in the case of using the pitch only.

That is, the pitch and cokes supplied into the rotary drum 1, rotatably supported, are gradually pressurized and, at the same time, heated. When temperature is raised to about 200° C, the pitch in the raw material starts to be fluidized and low-boiling-point compounds contained in the fluidized pitch start to be volatilized and are drained out as an exhaust gas (which can also be used again for heating). Next, when temperature is raised further, the condensation reaction of the pitch proceeds and when temperature is further raised up to about 400° to 500° C, the pitch is completely solidified into a baked article.

With the conventional carbon article manufacturing method, when temperature is rapidly raised, the volatile matters of low-boiling-point compounds in the pitch are volatilized to leave pores and no compact structure can be obtained. With this invention, however, even if the raw material is composed of the pitch and cokes, it is similarly pressurized by centrifugal force and the pores resulting from volatilization of the low-boiling-point compounds are immediately removed, so that it is possible to obtain a carbon article of compact structure which has substantially no pores. Further, in this invention, since the low-boiling-point compounds are forcibly volatilized, breathing of the exhaust gas is very excellent and baking can be rapidly effected in a short period of time.

The foregoing description has been made in connection with the making of a carbon article from pitch or a mixture of pitch and cokes. In this invention, however, use can be made of not only such raw materials but also the coking material which is fluidized when heated, or a raw material containing such coking material. The mixing with the coking material may be effected either before or after molding. Accordingly, a desired carbon article can be made, for example, from the raw material composed of carbonaceous fiber and pitch or resin, or pitch only. Especially, in the case of using the carbonaceous fiber and pitch, the carbon material accumulated on the inner wall of the rotary drum is not ever peeled off during baking, so that an excellent carbonaceous-fiber-carbon compound can be obtained.

Moreover, even when the raw material is composed of more than two kinds of components as mentioned above, the relationship equation concerning pressurization by centrifugal force holds and, in this case, the pressure (P) is a pressure at the outer diameter of the rotary drum 1 and ρ is the bulk density of the raw material.

The foregoing description has been given with regard to the case of achieving baking and pressurization directly in the rotary drum. In this case, however, the raw material makes direct contact with the inner wall surface of the rotary drum and there are some occasions when removal of the resulting carbon article from the rotary drum is difficult. To avoid this, a molded case as of artificial graphite is placed in the rotary drum and the raw material is housed in this molded case. Our experiments show that the use of a sheet of expanded graphite and a cylindrical molded article allows ease in removal of the baked article from the rotary drum without adherence of the article to the inner wall of the rotary drum. Further, in the case of a molding case, even if the rotary drum is not shaped to conform to the carbon article to be ultimately obtained, it is possible to easily obtain a carbon article of any desired section, for example, polygonal section, by the use of a molding case conforming to the carbon material desired to obtain.

For example, the rotary drum 1 shown in FIG. 1 is cylindrical but, if a tubular molding case (not shown) is placed in the rotary drum, a tubular carbon article can be easily obtained as is the case with the foregoing.

Moreover, with the present invention, it is possible to obtain not only a tubular carbon article but also those polygonal in section, for example.

Figure 2:
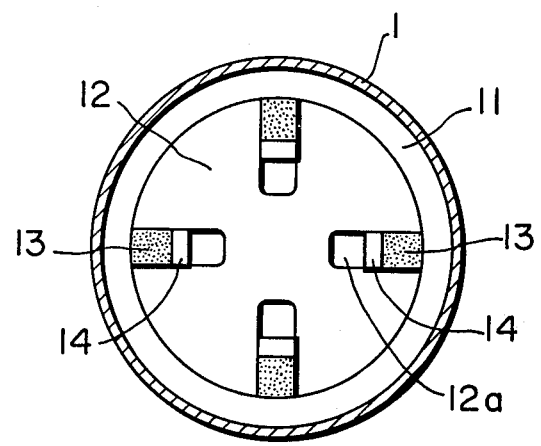
FIGS. 2 and 3 are plan views respectively illustrating examples of raw material housing means employed in the carbon article manufacturing apparatus depicted in FIG. 1.

FIG. 2 shows one example of the manufacture of carbon articles of square section. In this case, it is sufficient only to provide a graphite case 12 in the cylindrical rotary drum through a graphite drum 11 serving as a liner. That is, the graphite case 12 has formed therein at least two grooves 12a of square section in the radial direction thereof. A raw material 13 is packed in each of the grooves 12a and pressed by a weight 14 in the groove from the inside thereof. In such a case, the raw material 13 in each groove 12a is pressurized by the revolution of the rotary drum 1 and the weight 14 is subjected to centrifugal force, so that the raw material 13 is pressed by the weight 14. Thus, carbon articles square in section can be easily obtained. The weight 14 is preferred to be of as large specific density as possible and, in the case of large specific density, the resulting pressure is high and a carbon article of compact structure can be easily obtained.

Figure 3:
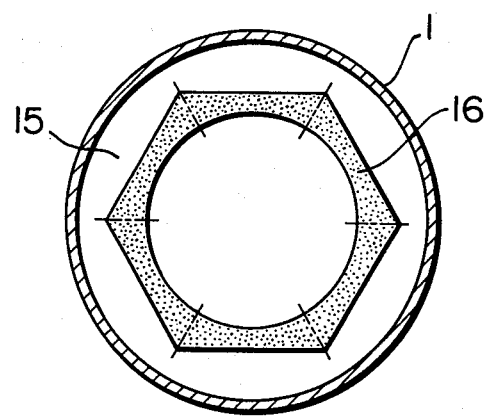

Further, with the present invention, it is also possible to obtain plate-like carbon articles. FIG. 3 shows one example of the manufacture of plate-like carbon articles. In this case, the inner wall of a graphite case 15 is formed to be polygonal in section and the graphite case 15 is inserted in the rotary drum 1. By revolving the case 15 containing a raw material, the raw material is press molded by centrifugal force and baked by heating. Thus, a carbon article 16 is obtained which has a polygonal outer periphery and a circular inner periphery. The carbon article 16 is severed along broken lines in FIG. 3 into individual plate-like carbon articles. In this case, since the inner arc-shaped portion can be made flat by slight working, the carbon article can be easily shaped into a plate-like member.

In the cases of FIGS. 2 and 3, the graphite cases whose inner walls are formed polygonal in section as required are provided separately of the rotary drum. However, it is also possible to form the inner wall of the rotary drum to be polygonal in section.

Further, the foregoing example have been described in connection with the case where one rotary drum is constructed to be rotatable at its center. In this invention, however, such a construction of the rotary drum is not always necessary. That is, it is also possible that at least two or more rotary drums are constructed to be rotatable.

Figure 4:
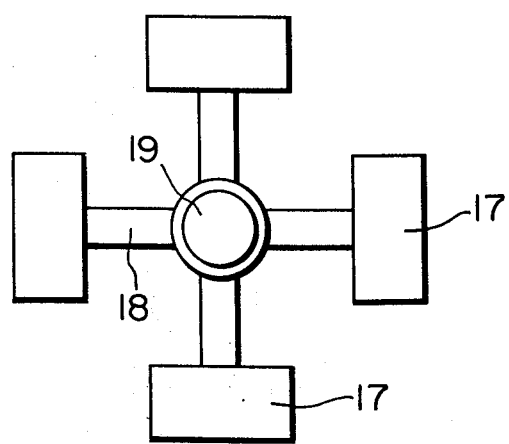
FIG. 4 is a plan view showing raw material housing means used in another example of the carbon article manufacturing apparatus of this invention employing four raw material housing means.
Figure 5:
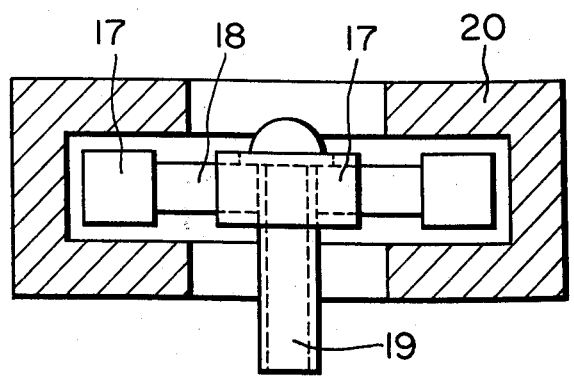
FIG. 5 is a front view, partly in section, of the housing means shown in FIG. 4.

For example, in the case of FIG. 4, four rotary drums 17 are supported by rotary arms 18 and a rotary shaft 19. With such a construction, a plurality of rotary drums can be employed at the same time. Further, in this case, even if the plurality of rotary drums 17 are supported around horizontal rotary arms and are positioned in a horizontal direction, the object can be attained.

Where the four rotary drums 17 are used as shown in FIG. 4, it is not always necessary to surround their entire structure with a heating furnace. That is, it is sufficient only that the four rotary drums 17 and the space of their rotation are surrounded with a heating furnace 20. Moreover, in this construction, the heating furnace 20 need not always be ordinary electric resistance heating type but may also be an induction heating type.

This invention will be further described in connection with its one example.

EXAMPLE 1

A rotary drum was formed with an iron cylinder having an inner diameter of 610 mm and 1800 mm long and is constructed to be rotatable in a horizontal direction. A carbon cloth impregnated with pitch was put on the inner wall surface of the rotary drum. The rotary drum was revolved at a speed of about 1500 rpm and, at the same time, heated by a heater from the outside in a nitrogen atmosphere. A pipe having many small holes formed at its one end was disposed on the central axis of the rotary drum. Mesophase pitch fused by heating above 300° C was supplied to the pipe while reciprocating it, and the pitch was jetted out from the small holes towards the inner wall surface of the rotary drum at high speed. The rotary drum was heated so that the external temperature of the pitch may be about 500° C to thereby volatilize volatile matters in the pitch and further condensation of the pitch to solidify it. The operation was continued until the inner diameter of the pitch accumulated on the inner wall of the rotary drum reached 240 mm. Then, jetting of the pitch was stopped but heating was continued until the central portion of the carbon article was solidified. In this case, it is preferred that gas of the volatile matter is used as a fuel for heating. Next, a carbon powder used as a packing material was packed in an iron frame having its outer wall formed with refractory bricks and the hollow carbon article obtained as described above was embedded in the carbon powder. And the carbon article is heated to 2700° C by applying a current to carbon cloth extending out from both end faces of the carbon article, by which the carbon article was graphitized. Thus, a hollow graphite electrode is easily obtained.

After the graphitization, the packing material can readily be removed only by removing the refractory bricks, so that the electrode as a product can be easily taken out from the iron frame.

EXAMPLE 2

50 wt% of chopped carbon fibers (5μ in diameter and 10 mm in length) having a specific gravity of 1.74, a tensile strength of 300 kg/mm² and an elastic modulus of 20 tons/mm² and 50 wt% of a hard pitch having a softening point of 210° C and fixed carbon 75% were mixed together at 250° C. 2.0 kg of the mixture was put in a rotary drum made of stainless steel and having an inner diameter of 20 cm and a height of 15 cm and heated in a nitrogen atmosphere to 500° C at the rate of 100° C/hr, with the rotary drum being revolved at a speed of 3500 rpm. The resulting hollow baked member was heated to 2800° C in an electic furnace, obtaining a graphitized carbon article. Its properties were as follows:

Bulk density:      1.65
Tensile strength:   520 kg/cm²
Bending strength:   1080 kg/cm²
Electric resistivity:  110 × $10^{-5}$ Ωcm
Gas permeability:   $10^{-7}$ cm²/sec.

EXAMPLE 3

A rotary drum made of stainless steel, 20 cm in inner diameter and 15 cm in height, was lined with a sheet of swelled graphite of 0.2 mm as a mold releasing member. Further, a cloth of carbon fibers (6μ in diameter) having a specific gravity of 1.74, a tensile strength of 315 kg/mm² and an elastic modulus of 21 tons/mm² was applied on the abovesaid sheet. A fused hard pitch (softening point 250° C and fixed carbon 78%) was uniformly jetted at the rate of 5 g/sec. into the rotary drum revolved at a speed of 2700 rpm. The atmosphere in the rotary drum was nitrogen and the baking temperature was raised to 500° C at the rate of 100° C/hr and then to 1200° C at the rate of 200° C/hr. The fused pitch permeated into the cloth and then carbonized. Thus, a cylindrical carbon article having the carbon fibers and carbon united together was obtained. The carbon article thus obtained had the following properties:

Bulk density:      1.60
Tensile strength:   850 kg/cm²
Bending strength:   1500 kg/cm²
Electric resistivity:  500 × $10^{-5}$ Ωcm
Gas permeability:   $10^{-6}$ cm²/sec.
Rate of content of carbon fiber:   55% (volume ratio)

EXAMPLE 4

A carbon article manufacturing apparatus identical in construction with that shown in FIG. 4 was used, which had four rotary drums, each 200 mm in width, 100 mm in depth and 100 mm in height; and each rotary arm was 400 mm long (between the center of rotation and each rotary drum). 50 parts of a hard pitch having softening point of 200° C and fixed carbon 70% was mixed with 100 parts of petroleum coke powder having a particle size of less than 150μ (containing 60% by weight of less than 74μ). 2 kg of the mixture was poured into each rotary drum and heated in a nitrogen atmosphere to 500° C at the rate of 80° C/hr, the rotary drum being revolved at a speed of 1800 to 3500 rpm. (1800 rpm. from 200° to 350° C and 3500 rpm. above 350° C). The resulting plate-like baked member was taken out from each rotary drum and heated to 2800° C in an electric furnace, obtaining a graphitized carbon article, which had the following properties:

Bulk density:      1.7
Tensile strength:   220 kg/cm²
Bending strength:   430 kg/cm²
Electric resistivity:  80 × $10^{-5}$ Ωcm
Gas permeability:   $10^{-3}$ cm²/sec.

It will be apparent that many modifications and variations may be effected without departing from the scope of the novel concepts of this invention.

As described in the above examples, this invention enables molding and baking of carbon articles to be achieved in a single process and by a single apparatus, to provide for improved productivity. Further, according to this invention, a carbon article of compact structure can be easily produced because volatile matters in the carbon article are sufficiently volatilized during baking, as set forth previously. Moreover, the tensile strength and bending strength of the carbon article are enhanced and, in particular, its gas permeability is greatly enhanced.

It will be apparent that many modifications and variations may be effected without departing from the scope of the novel concepts of this invention.

We claim as our invention:

1. A carbon article manufacturing method comprising the steps of revolving a rotary hollow member having a carbonaceous material containing a coking material therein at a rotational speed sufficient to mold said material under pressure in the range of 10 to 500 kg/cm² by centrifugal force, and, while revolving the member, gradually baking said member by raising its temperature from room temperature to higher than 400° C., said rotary hollow member having a nonoxidizing atmosphere therein whereby molding and baking said material is simultaneously carried out.

2. A carbon article manufacturing method according to claim 1, wherein the resulting carbon article is subjected to graphitization.

3. A carbon article manufacturing method according to claim 1, wherein the carbonaceous material is a mixture of chopped carbonaceous fibers and a coking material which is fused when heated.

4. A carbon article manufacturing method according to claim 1, wherein the carbonaceous material is a mixture of coke and a coking material which is fused when heated.

5. A carbon article manufacturing method according to claim 1, wherein the carbonaceous material is a coking material which is fused when heated.

6. A carbon article manufacturing method according to claim 1, comprising the step of injecting a fused coking material into the revolving rotary hollow member to deposit said material on the inner wall surface of the rotary hollow member by centrifugal force while heating the deposited material to carbonize it under said nonoxidizing atmosphere, whereby volatile matters contained in the deposited material are volatilized.

7. A carbon article manufacturing method according to claim 6, wherein the resulting carbon article is subjected to graphitization.

8. A carbon article manufacturing method according to claim 1, comprising the steps of laminating carbon fibers on the inner wall surface of the rotary hollow member, revolving the rotary hollow member, and injecting a fused coking material onto the laminated carbon fibers to deposit the coking material on the laminated carbon fibers by centrifugal force while heating said material and said fibers to carbonize under said nonoxidizing atmosphere.

9. A carbon article manufacturing method according to claim 8, wherein the resulting carbon article is subjected to graphitization.

* * * * *